United States Patent [19]

Carcia et al.

[11] 4,264,685
[45] Apr. 28, 1981

[54] OXYGEN ELECTRODE OF THE TYPE PT$_3$MO$_6$

[75] Inventors: Peter F. Carcia, Wilmington, Del.; Robert D. Shannon, Chadds Ford, Pa.; Dimitri N. Staikos, Wilmington, Del.

[73] Assignee: E. I. Du Pont de Nemours and Company, Wilmington, Del.

[21] Appl. No.: 103,955

[22] Filed: Dec. 14, 1979

[51] Int. Cl.[3] .................. H01M 4/92; H01M 8/08
[52] U.S. Cl. .................. 429/40; 429/44; 429/46; 204/242; 204/278; 252/473
[58] Field of Search ............. 429/40, 44, 46; 252/472, 473, 474; 423/22, 593; 204/290 F, 242, 278

[56] References Cited

U.S. PATENT DOCUMENTS

3,663,181   5/1972   Shannon .................. 252/472 X

FOREIGN PATENT DOCUMENTS

1134111   11/1968   United Kingdom .

OTHER PUBLICATIONS

Meadowcroft, "Low-Cost Oxygen Electrode Material," Nature (London), vol. 226, p. 847 (1970).
Matsumoto et al., "New Catalyst for Cathodic Reduction of Oxygen," Chem. Lett., pp. 661-662 (1975), Chemical Society of Japan.
Matsumoto et al., "Electrochem. Prop. of Lanthanum Nickel Oxide," J. Electroanal. Chem., 80 (1977), pp. 115-121.
Matsumoto et al., J. Electroanal. Chem., 83, (1977), pp. 167-176.
Muller et al., "Two New Ternary Copper Platinum Oxides," J. Less-Common Metals, 19, 209-214, (1969).
Hoekstra et al., "Platinum Group Metals and Compounds," Advan. Chem. Ser., No. 98, pp. 39-53 (1971).
Cahen et al., "Platinum Bronzes," Inorg. Chem. vol. 13, No. 6, pp. 1377-1388, (1974).
Kunz, "Proceedings of the Symposium on Electrode Materials and Processes for Energy Conversion and Storage," vol. 77-6, edited by McIntyre et al., The Electrochemical Society, Inc., Princeton, N.J., pp. 607-620.

*Primary Examiner*—Anthony Skapars

[57] ABSTRACT

Electrode comprised of the electrocatalyst of the prototype formula Pt$_3$MO$_6$ wherein M is Mn, Fe, Co, Ni, Zn, Mg, Ca, Cu, Cd or Hg.

20 Claims, 10 Drawing Figures

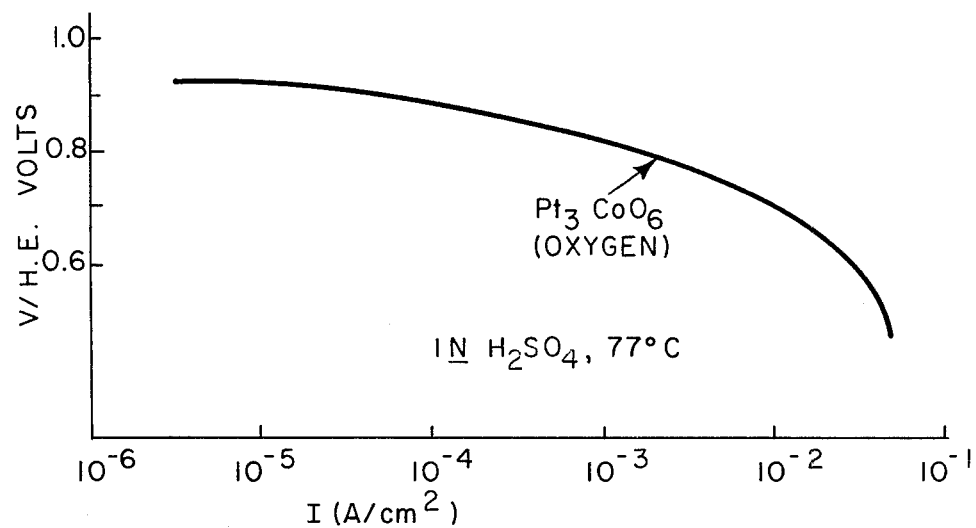
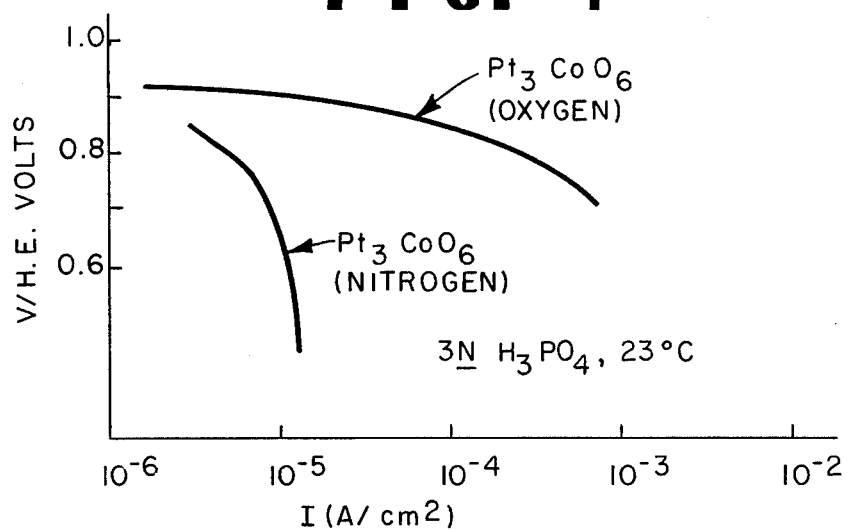

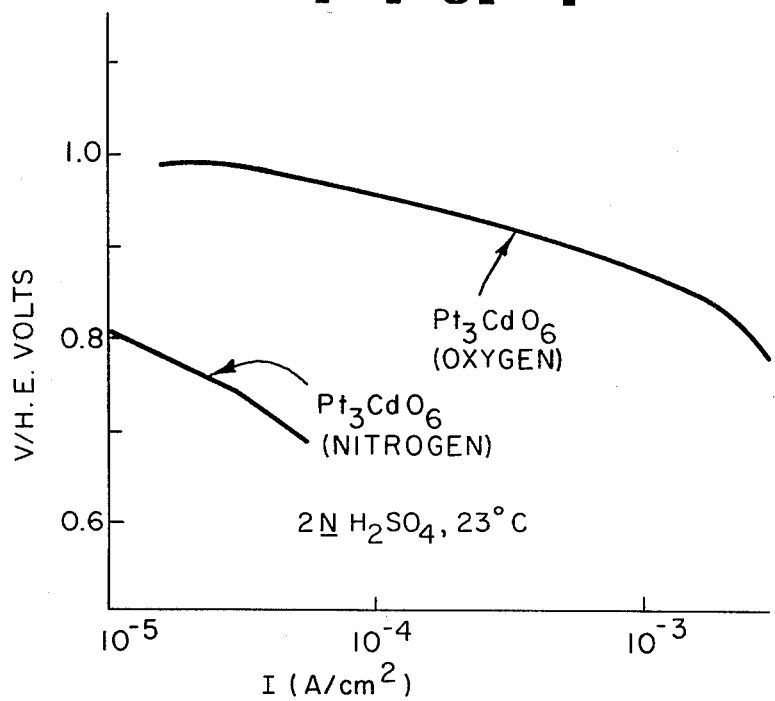
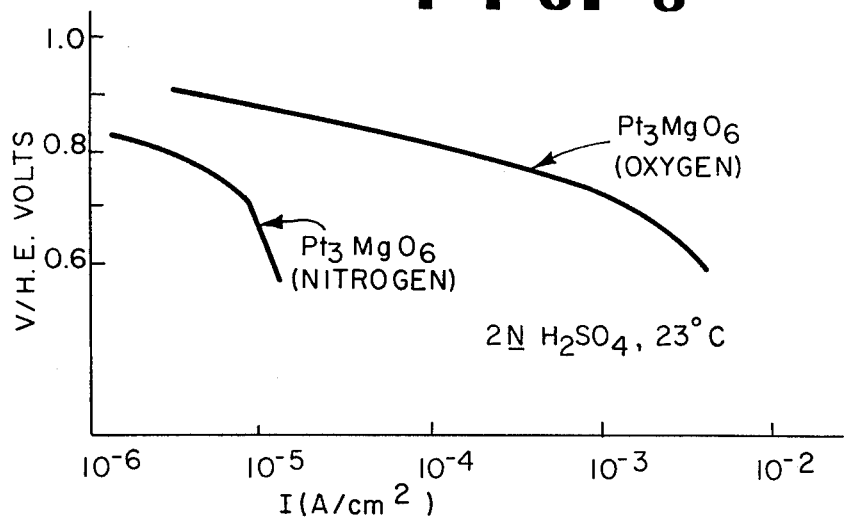

OXYGEN ELECTRODE OF THE TYPE $Pt_3MO_6$

DESCRIPTION

TECHNICAL FIELD

This invention relates to oxygen electrodes comprised of a particular ternary platinum-metal oxide for use in electrochemical devices.

BACKGROUND

Fuel cells which are known in the art can, in general, be grouped into two classes, depending on the operating temperature of the cell: (1) high temperature fuel cells which are operated at about 600° C. to 700° C. using solid electrolytes or fused salt electrolytes and (2) low temperature fuel cells which are operated at below about 200° C. using either alkaline electrolytes, such as potassium hydroxide, or acid electrolytes, such as sulfuric acid or phosphoric acid.

The alkaline electrolyte cell has the disadvantage that $CO_2$ cannot be tolerated because it reacts with the alkaline solution and results in the precipitation of solid carbonates which physically block catalyst sites on the anode (the fuel electrode), thereby reducing electric power generation. This intolerance of alkaline cells to $CO_2$ restricts the choice of both the oxidant and the fuel. For example, economically, air is preferred over pure oxygen as the oxidant, but if air is used, it must first be scrubbed to remove $CO_2$. The choice of fuel is restricted to either pure hydrogen or pure hydrazine. If a carbonaceous fuel is used, means must be provided to prevent the $CO_2$ by-product from contacting the electrolyte.

Since the acid electrolyte cell can tolerate $CO_2$, unscrubbed air, as the oxidant, and a carbonaceous material, as the fuel, can be used. Sulfuric acid or phosphoric acid is most commonly used as the electrolyte. The phosphoric acid cell is theoretically the most suitable because, in addition to its tolerance of $CO_2$, it supplies the heat required for the vaporization of water (The introduction of "From Electrocatalysis to Fuel Cells" edited by G. Sandstede, Univ. of Washington Press, Seattle, Washington, 1972).

The electrocatalyst used as an electrode in either an alkaline or acid cell should exhibit high specific activity, long life and low polarization loss. Various types of platinum electrodes have been used as both anodes and cathodes in alkaline and acid electrolyte fuel cells. However, platinum is a poor catalyst for the reduction of oxygen. The exchange current density, which is a measure of the rate of an electrochemical reaction, for the reduction of oxygen on platinum is 4 or 5 orders of magnitude smaller than the exchange current density for the oxidation of hydrogen on platinum. The search for better electrocatalysts for oxygen reduction thus far appears to have been successful only for alkaline electrolyte cells. Meadowcroft (*Nature* (London) 226, 847 (1970)) discloses that $La_{0.8}Sr_{0.2}CoO_3$ possesses higher activity than platinum in the reduction of oxygen in potassium hydroxide. Matsumoto, Yoneyama and Tamura (*Chem. Lett.*, 661 (1975); *J. Electroanal. Chem.* 80, 115 (1977); ibid. 83, 167 (1977)) disclose that the activity of perovskite oxides based on $LaNiO_3$ in the reduction of oxygen in sodium hydroxide is comparable to that of platinum. None of these oxygen reduction electrocatalysts which are useful with basic electrolytes is stable in acid. Because of its stability in acid, platinum is generally chosen for the oxygen reduction cathode in an acid cell even though it is not a particularly good electrocatalyst for reducing oxygen and even though platinum is not entirely stable. As to the latter, it is known that the surface area of an oxygen reduction platinum cathode in a phosphoric acid fuel cell decreases with time, thus causing lower cell output power (Kunz, "Proceedings of the Symposium on Electrode Materials and Processes for Energy Conversion and Storage," Vol. 77-6, edited by McIntyr et al., The Electrochemical Society, Princeton, New Jersey, p. 607).

U.S. Pat. No. 3,663,181 discloses platinum-metal oxides of orthorhombic structure and having the prototype formula $Pt_3MO_6$ wherein M is Mn, Fe, Co, Ni, Cu, Zn, Mg or Cd; the process for preparing these platinum-metal oxides by heating appropriate metal oxdides in an oxygen-rich atmosphere at above 500° C. and a pressure of at least 100 atmospheres; and the use of these platinum-metal oxides as catalysts for the hydrogenation of ethylene. Mueller and Roy, J. Less-Common Metals, 19, 209 (1969) disclose the preparation of $Pt_3CuO_6$ by reacting cupric oxide and platinum black at 200 atmospheres of oxygen and 890° C. Hoekstra, Siegel and Gallagher, Advan. Chem. Ser., No. 98, 39 (1971), disclose the preparation of $MPt_3O_6$, wherein M is Co, Ni, Cu, Mg, Zn, Cd or Hg, by heating a 1:1 molar ratio mixture of the appropriate oxides at 800° C. and 40 kb pressure for one hour. Cahen, Ibers and Wagner, Inorg. Chem. 13, 1377 (1974) disclose the preparation of $Cd_xPt_3O_6$ from $CdCO_3$ and $(NH_4)_2 PtCl_6$, or platinum black, under one atmosphere of oxygen at 580° C. for one week. British Pat. No. 1,134,111 discloses the use of a homogeneous mixture of a platinum group oxide and an oxide of nickel, cobalt, iron or copper, in a weight ratio of not less than 3:1, in catalyzed reactions.

BRIEF DESCRIPTION OF DRAWINGS

FIG. 3 shows the oxygen reduction characteristic for a $Pt_3CoO_6$ electrode in oxygen-saturated 1N $H_2SO_4$ electrolyte at 77° C.

FIG. 4 shows the oxygen reduction characteristic for a $Pt_3CoO_6$ electrode in oxygen-saturated and nitrogen-saturated 3N $H_3PO_4$ electrolyte at 23° C.

FIG. 7 shows the oxygen reduction characteristic for a $Pt_3CdO_6$ electrode in oxygen-saturated and nitrogen-saturated 2N $H_2SO_4$ electrolyte at 23° C.

FIG. 8 shows the oxygen reduction characteristic for a $Pt_3MgO_6$ electrode in oxygen-saturated and nitrogen-saturated 2N $H_2SO_4$ at 23° C.

DISCLOSURE OF INVENTION

Figure 1:
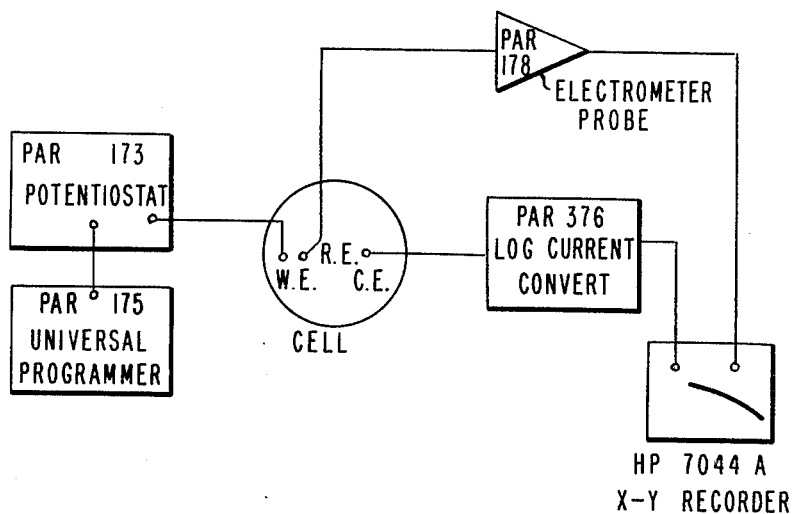
FIG. 1 is a schematic diagram of the electrochemical measurement system which was used to determine elctrochemical data herein.

For further comprehension of the invention, and of the objects and advantages thereof, reference may be made to the following description and accompanying drawings, and to the appended claims in which the various novel features of the invention are more particularly set forth.

The present invention resides in the discovery that the orthorhombic crystalline ternary platinum-metal oxide having the prototype formula $Pt_3MO_6$, wherein M is Mn, Fe, Co, Ni, Zn, Mg, Ca, Cu, Cd or Hg, is useful as an electrocatalyst and, more specifically, as the electrode, especially the cathode, in electrochemical processes for the reduction of oxygen. The preferred platinum-metal oxide is $Pt_3CdO_6$. As indicated, the oxide has the orthorhombic crystal structure. It has the space group Cmmm except when M is Cu; $Pt_3CuO_6$ has a slightly more elongated orthorhombic unit cell and has the space group Pnnm or Pnn2.

A characteristic and invariant feature of the ternary platinum-metal oxide is its orthorhombic crystal structure. This is manifest by a distinctive X-ray diffraction pattern, examples of which are shown in Table I of the aforesaid U.S. Pat. No. 3,663,181. When M is Cd, Cu and Hg and probably when M is Ca, the platinum-metal oxide is characterized by a 3:1:6 stoichiometry, that is, the formula is $Pt_3CdO_6$, $Pt_3CuO_6$, $Pt_3HgO_6$ and $Pt_3CaO_6$. The other ternary platinum-metal oxides have the approximate formula $Pt_3MO_6$, but in these cases this formula represents only the ideal or prototype composition. As will be appreciated by those skilled in the art, deviations from the prototype composition can be quite extensive without major alteration in the properties of these ternary oxides or in the structural relationships by which they can be identified. The ternary oxides with the approximate formula $Pt_3MO_6$ (M=Mn, Fe, Co, Ni, Zn and Mg) can have from about 2.2 to about 3.2 gram atoms of platinum per formula weight and still retain the characteristic orthorhombic structure. The characteristic orthorhombic structure is likewise retained over an operable range of gram atoms of metal (M) from the prototype value of about 1.0 to as much as about 1.4. Furthermore, the total gram atoms of metal need not have the precise relationship to the gram atoms of oxygen as the 4.0/6.0 ratio indicated by the prototype formula. Thus, there may be from about 3.2 to about 4.3 gram atoms of total metal for every 6 gram atoms of oxygen. Such variation in oxygen content is common in minerals containing elements of variable oxidation state and is not surprising in the oxides of this invention since these oxides contain both $Pt^{+2}$ and $Pt^{+4}$ ions as well as other metal ions, many of which readily adopt mixed oxidation states.

The oxide may also be described as an oxide having the general formula $Pt_xM_yO_6$, wherein M is Mn, Fe, Co, Ni, Zn, Mg, Ca, Cu, Cd or Hg, x is about 2.2 to about 3.2, y is about 1.0 to about 1.4 and x+y is about 3.2 to about 4.3, provided, however, when M is Cu, Cd, or Hg and, probably, when M is Ca, x is 3, y is 1 and x+y is 4.

The oxide can be prepared using elevated pressure and a sealed reaction system, as described in detail in the above-mentioned U.S. patent. When M is Ca or Cd the oxide can be prepared at a lower pressure using platinum black or a chloride of platinum and a calcium or cadmium oxide, carbonate, nitrate or hydroxide, the reaction temperature being sufficiently low to preclude decomposition of the oxide.

As indicated, the oxide is substantially insoluble in hot aqua regia and in hot (for example, 180°–190° C.) phosphoric acid. The insolubility in aqua regia provides a convenient method of purification if impurity phases consisting of metal oxides other than $PtO_2$ are present. The low solubility in hot phosphoric acid is a requirement for utility in an acid fuel cell. X-ray analysis of samples placed in 85% phosphoric acid at 180° C. for 100–400 hours showed no detectable change. Elemental analysis of each recovered phosphoric acid showed only a trace of metal(s).

BEST MODE FOR CARRYING OUT THE INVENTION

The best mode for carrying out the invention is believed to consist of using $Pt_3CdO_6$ in the form of a gas diffusion or porous electrode.

INDUSTRIAL APPLICABILITY

An electrode of the platinum-metal oxide is particularly useful as the oxygen reduction cathode in both acidic and alkaline electrolytes in electrochemical devices, such as fuel cells, air-metal batteries and caustic-chlorine producing cells and as the oxygen electrode in electrolyzers and metal electrowinning devices. The platinum-metal oxide is substantially insoluble in hot strong acids, such as phosphoric acid and aqua regia, and it exhibits high activity as a catalyst in the reduction of oxygen in acid electrolytes. It is, therefore, particularly useful as the cathode in acid electrolyte fuel cells, especially phosphoric acid fuel cells.

The electrode can be fabricated in a variety of shapes. For instance, it can be comprised of a coating or dispersion of finely-divided platinum-metal oxide on an electrically conducting support, for example, carbon, or it can be comprised of a solid ceramic. In the preferred embodiment the electrode is comprised of finely divided $Pt_3MO_6$ on an electrically conducting support, with adequate provision for rapid physical transfer of reactants ($O_2$, $H_3O^+$) and product ($H_2O$). Such electrodes are known in the art as gas diffusion or porous electrodes.

EXAMPLES

The following discussion of the ternary platinum-metal oxide of the prototype formula $Pt_3MO_6$ is not intended as a limitation but rather it is intended to illustrate to one skilled in the art the utility of these platinum-metal oxides as electrocatalysts for oxygen reduction and evolution.

For the purpose of demonstrating the electrocatalytic characteristics of $Pt_3MO_6$, electrodes can be prepared using a $Pt_3MO_6$ coating on a gold foil substrate. Gold is used as the substrate because it has a low activity (substantially below that for $Pt_3MO_6$ material) for oxygen reduction in acid and, therefore, its contribution to the overall oxygen reduction current can be neglected. Three parts by weight of finely powdered $Pt_3MO_6$ electrocatalyst are mixed with approximately one part by weight of Teflon ® 30. Water is added to make a slurry which is applied to the gold foil substrate. The coating is dried at 100°–150° C. for ½ hour and then fired at 300° C. for 1 hour in air, thereby providing a tough coherent coating with good adhesion to the gold substrate and low electrical resistance (typically less than 100 ohms) between the face of the coating and the underside of the gold substrate. Electrical connection is made to the electrode by a gold wire welded to the underside of the gold substrate. The gold wire is threaded through a glass sleeve which supports the electrode. The electrochemical properties are measured on 1 cm² (geometric area) coated gold-foil electrode submersed in electrolyte.

Electrochemical measurements are made in a glass half-cell with reference and counter electrode compartments separated from the main reservoir by fine glass frits. The anode is a 4-cm², smooth platinum sheet. The reference electrode is either a saturated calomel electrode (S.C.E.) or a dynamic hydrogen electrode (D.H.E.). Aqueous solutions of sulfuric acid or phosphoric acid, prepared with triply distilled water in concentrations ranging up to 2N and 44N (85%), respectively, are used as electrolytes. Aqueous solutions of potassium hydroxide have also been used as electrolytes. All potentials (E) are expressed with respect to the theoretical hydrogen electrode (H.E.) potential. Thus, the potential in volts is expressed as V/H.E. The current density measured with respect to the geometric area is expressed as A/cm². The $O_2$ reduction and evolution characteristics for $Pt_3MO_6$ electrodes are obtained by slowly sweeping the electrode potential from a Princeton Applied Research (PAR) 173 Potentiostat with a linear waveform from a PAR 175 Universal Programmer. The logarithm of the current can be recorded directly versus voltage by using the PAR 376 logarithmic current-to-voltage converter. FIG. 1 illustrates this measurement system. The oxygen reduction characteristic is run on both oxygen-saturated and nitrogen-saturated electrolytes. The cathodic currents in nitrogen are negligible compared to those in oxygen, which demonstrates that the electrode is electrocatalytic for oxygen reduction. In some Examples, the activity of the electrode is given as the current density at a particular potential. For these Examples, the corresponding current with the nitrogen-saturated electrolyte is also negligibly small.

EXAMPLE 1

Figure 2:
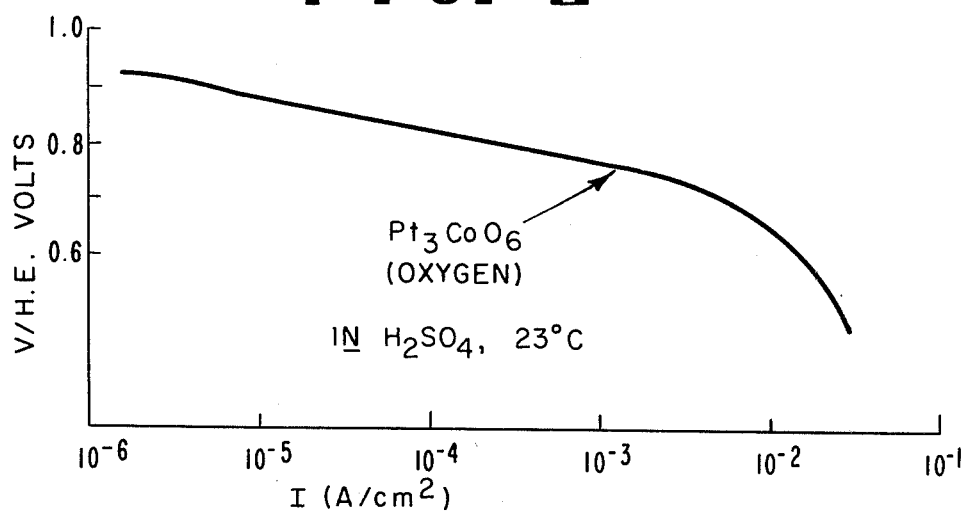
FIG. 2 shows the oxygen reduction characteristic for a $Pt_3CoO_6$ electrode in oxygen-saturated 1N $H_2SO_4$ electrolyte at 23° C.

A mixture of 0.4 g of $Pt_3CoO_6$, 0.5 g of $PtO_2$, 0.4 g of $Co_3O_4$, 2 ml of $H_2O$ and 1 ml of aqueous HCl was sealed in a gold tube ⅜" (0.95 cm) diameter×4" (10.2 cm) long, heated at 700° C. and 3000 atm (3.04×10⁵ kPa) for 24 hours and quenched. X-ray examination of the product showed only the orthorhombic phase with nominal composition $Pt_3CoO_6$ and cell dimensions: a=7.085 A (708.5 pm), b=9.930 A (993.0 pm) and c=3.142 A (314.2 pm). The sample was treated in boiling aqua regia for 7 hours to remove impurities. A portion (10 mg) of the powdered $Pt_3CoO_6$ thus prepared was mixed with approximately 10 mg of a mixture of Teflon ® 30 and $H_2O$ (1:3 volume ratio) to form a slurry. The slurry was applied as a coating to a 1 cm² gold foil substrate, dried at 100° C. and then fired for 1 hour at 300° C. A gold wire was attached to the gold foil substrate to make an electrode which was tested as an oxygen reduction cathode in sulfuric and phosphoric acid electrolytes saturated with oxygen. The oxygen reduction characteristic for this electrode in 1N $H_2SO_4$ and 3N $H_3PO_4$ is shown in FIGS. 2, 3 and 4. FIG. 4 also shows the corresponding characteristic in phosphoric acid saturated with nitrogen.

Figure 5:
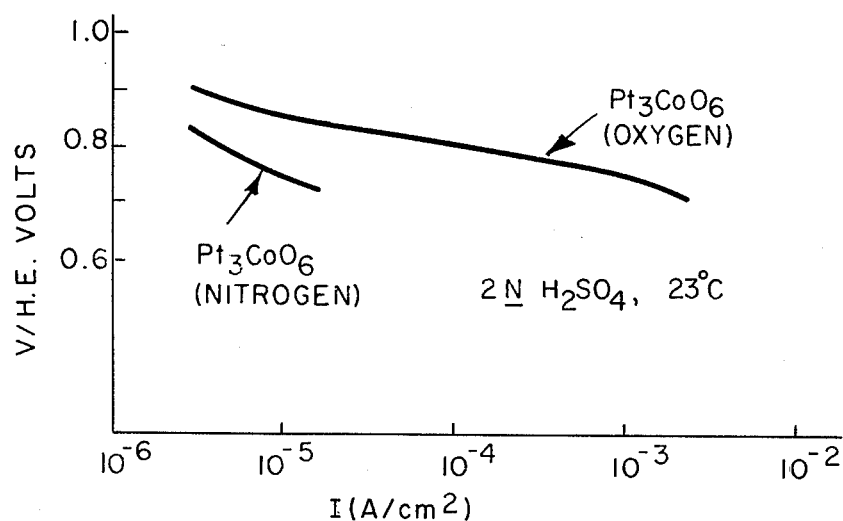
FIG. 5 shows the oxygen reduction characteristic for a $Pt_3CoO_6$ electrode in oxygen-saturated and nitrogen-saturated 2N $H_2SO_4$ at 23° C.

Another portion (15 mg) of the $Pt_3CoO_6$ powder was mixed with 10 mg of Teflon ® 30 and 20 mg of $H_2O$ to form a slurry. The slurry was coated onto a 1 cm² gold foil substrate; the coating was dried at 100° C. and then fired at 300° C. for 1 hour. A gold wire was attached to the gold foil substrate to make an electrode. The oxygen reduction characteristics for this electrode in 2N $H_2SO_4$ electrolyte (saturated first with oxygen and then with nitrogen) at 23° C. are shown in FIG. 5.

EXAMPLE 2

A mixture of 0.3953 g of $PtO_2$, 0.1047 g of $Co_3O_4$, 0.5 cc of aqueous HCl and 1.5 cc of $H_2O$ was sealed in a gold tube, heated at 700° C. and 3000 atm (3.04×10⁵ kPa) for 24 hours and cooled slowly to room temperature. The black product was washed to remove unreacted material. X-ray examination of the product showed a mixture of $Pt_3CoO_6$ (with cell dimensions: a=7.084 A (708.4 pm), b=9.931 A (993.1 pm) and c=3.146 A (314.6 pm) and $\beta$-$PtO_2$. Some of the product was exposed to hot phosphoric acid for 434 hours. The clear solution remaining after centrifuging was colorless. X-ray examination of the recovered powder showed no detectable change from the unexposed product.

EXAMPLE 3

Figure 6:
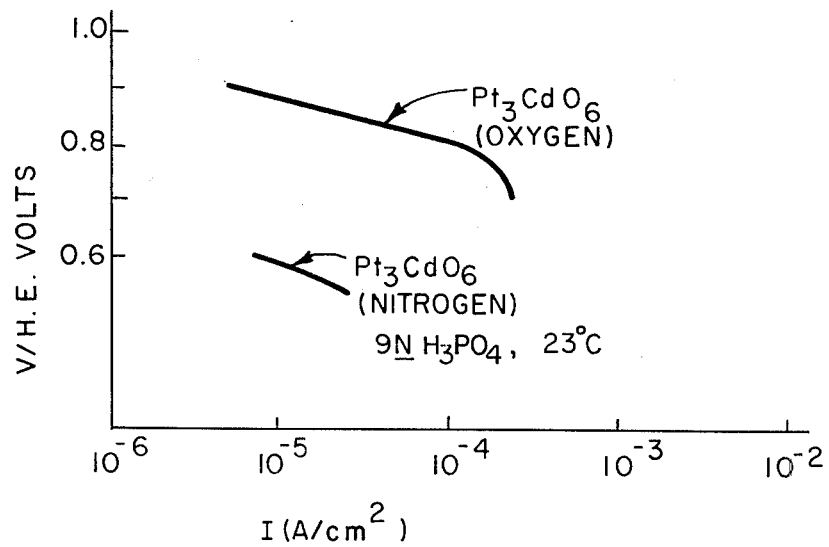
FIG. 6 shows the oxygen reduction characteristic for a $Pt_3CdO_6$ electrode in oxygen-saturated and nitrogen-saturated 9N $H_3PO_4$ at 23° C.

A mixture of 4.3772 g of $CdCo_3$ and 5.6279 g of $(NH_4)_2PtCl_6$ was thoroughly mixed using a mortar and pestle, heated for 1 week in an oxygen stream at 580° C. and cooled in the furnace. The dark-brown product was boiled in aqua regia for 48 hours, washed and dried. X-ray examination showed the product to be $Pt_3CdO_6$ with cell dimensions: a=7.222 A (722.2 pm), b=10.200 A (1020.0 pm) and c=3.161 A (316.1 pm). The surface area of the powder was 25 m²/g. A portion (20 mg) of the powdered $Pt_3CdO_6$ thus prepared was mixed with approximately 10 mg of a mixture of Teflon ® 30 and $H_2O$ (1:3 volume ratio). Additional $H_2O$ (20 mg) was added and the resultant slurry was coated onto a 1 cm² gold foil substrate. The coating was dried at 100° C. and then fired for 1 hour at 300° C. A gold wire was attached to the gold foil substrate to make an electrode. The oxygen reduction characteristics of this electrode in 9N $H_3PO_4$ electrolyte at 23° C. saturated first with oxygen and then with nitrogen are shown in FIG. 6. The activity was also measured in 9N $H_3PO_4$ electrolyte at 100° C. saturated with oxygen; the current density at 0.8 V/H.E. is 5×10⁻⁴ A/cm².

Another portion (10.5 mg) of the $Pt_3CdO_6$ powder was mixed with approximately 20 mg of a mixture of Teflon ® 30 and $H_2O$ (1:4 volume ratio) to form a slurry. The slurry was coated onto a 1 cm² gold foil substrate; the coating was dried at 100° C. and then fired at 300° C. for 1 hour. A gold wire was attached to the gold foil substrate to make an electrode which was tested as an oxygen reduction cathode in 2N $H_2SO_4$ electrolyte (saturated first with oxygen and then with nitrogen) at 23° C. The oxygen reduction characteristics of the electrode are shown in FIG. 7. Some of the product powder was exposed to hot phosphoric acid for 240 hours. The supernatant was clear and colorless. X-ray examination of the recovered powder showed no significant change in structure from the unexposed product.

EXAMPLE 4

A mixture of 0.8684 g of $PtCl_2$, 0.1316 g of MgO, 0.5 g of $KClO_3$ and 1 ml of $H_2O$ was sealed in a platinum tube ⅜" (0.95 cm) diameter×5" (12.7 cm) long, heated at 700° C. and 300 atm (3.04×10⁵ kPa) for 24 hours and cooled slowly to room temperature. The resultant product was treated with boiling aqua regia for 7 hours to remove most of the impurities. A small amount of β-PtO$_2$ which is insoluble in aqua regia remained, along with the Pt$_3$MgO$_6$ product. X-ray analysis of the product showed a trace of β-PtO$_2$ and orthorhombic Pt$_3$MgO$_6$ with cell dimensions: a=7.122 A (712.2 pm), b=9.934 A (993.4 pm) and c=3.146 A (314.6 pm). A portion (79.8 mg) of the Pt$_3$MgO$_6$ was mixed with approximately 30 mg of Teflon® 30 and approximately 20 mg of H$_2$O to form a slurry. The slurry was applied as a coating to a gold foil substrate, dried at 100° C. for ½ hour and then fired at 300° C. for 1 hour. A gold wire was attached to the gold foil substrate to make an electrode which was tested as an oxygen reduction cathode in 2N H$_2$SO$_4$ electrolyte (saturated first with oxygen and then with nitrogen) at 23° C. The oxygen reduction characteristics at this electrode are shown in FIG. 8.

EXAMPLE 5

Figure 9:
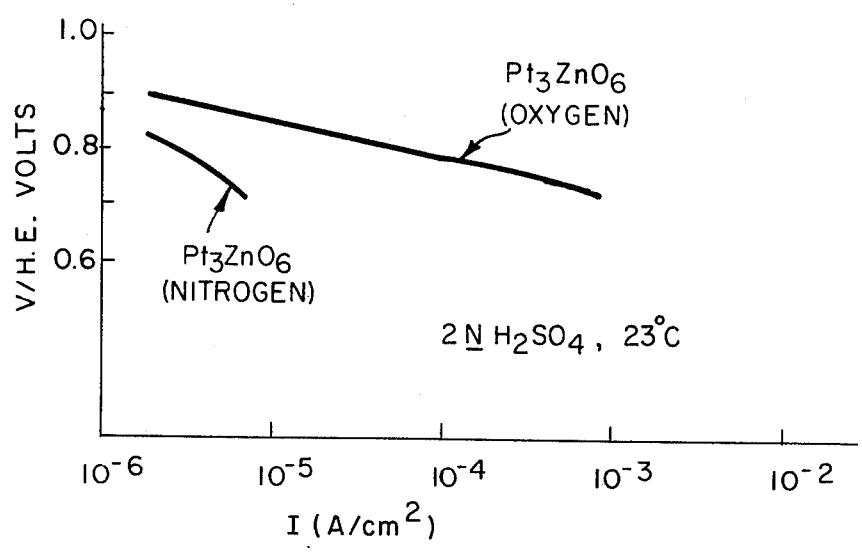
FIG. 9 shows the oxygen reduction characteristic for a $Pt_3ZnO_6$ electrode in oxygen-saturated and nitrogen-saturated 2N $H_2SO_4$ electrolyte at 23° C.

A mixture of 0.8748 g of PtO$_2$ and 0.1252 g of ZnO was ground in a mortar for 30 minutes, sealed in a platinum tube ⅜" (0.95 cm) diameter×5" (12.7 cm) long, heated at 850° C. and 3 kbar (3×10$^5$ kPa) for 12 hours and quenched to room temperature. The black product was heated for 7 hours in hot aqua regia, washed and dried. X-ray examination of the product showed orthorhombic Pt$_3$ZnO$_6$ with cell dimensions: a=7.126 A (712.6 pm), b=9.946 A (994.6 pm), c=3.145 A (314.5 pm). A few extra lines in the X-ray diffraction pattern indicated a trace of an impurity phase. Acid treatment removed this impurity. A portion (10.3 mg) of the Pt$_3$ZnO$_6$ was mixed with 20 mg of a mixture of Teflon® 30 and H$_2$O (1:4 volume ratio) to form a slurry. The slurry was coated onto a 1 cm$^2$ gold foil substrate. The coating was dried at 100° C. and then fired at 300° C. for 1 hour. A gold wire was attached to the gold foil substrate to make an electrode which was tested as an oxygen reduction cathode in 2N H$_2$SO$_4$ electrolyte (saturated with oxygen and then with nitrogen) at 23° C. The oxygen reduction characteristics are shown in FIG. 9.

EXAMPLE 6

Figure 10:
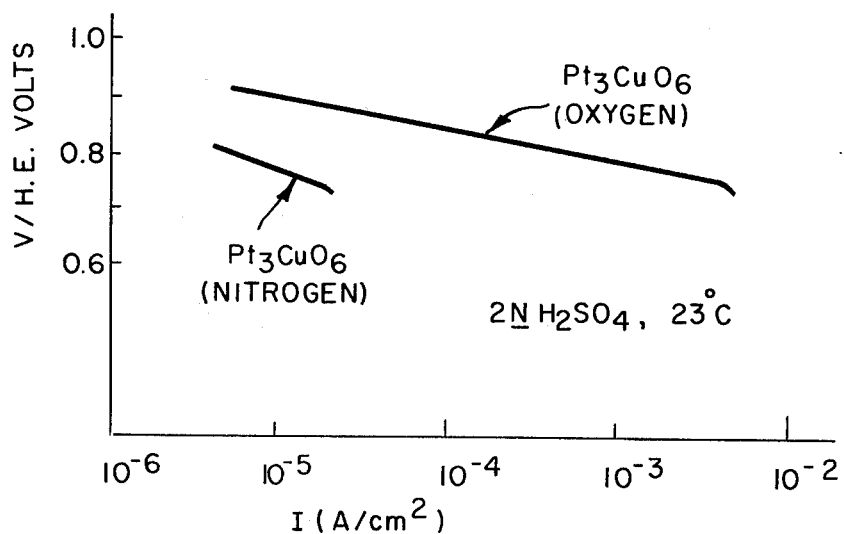
FIG. 10 shows the oxygen reduction characteristic for a $Pt_3CoO_6$ electrode in oxygen-saturated and nitrogen-saturated 2N $H_2SO_4$ electrolyte at 23° C.

A mixture of 0.8771 g of PtO$_2$ and 0.1228 g of CuO was ground in a mortar for 30 minutes, sealed in a platinum tube ⅜" (0.95 cm) diameter×5" (12.7 cm) long, heated at 850° C. and 3 kbar (3×10$^5$ kPa) for 12 hours and quenched to room temperature. The black product was heated for 7 hours in hot aqua regia, washed and dried. X-ray examination of the product showed orthorhombic Pt$_3$CuO$_6$ with cell dimensions: a=6.121 A (612.1 pm), b=11.583 A (1158.3 pm) and c=3.096 A (309.6 pm). A portion (15.2 mg) of the Pt$_3$CuO$_6$ was mixed with approximately 39 mg of a mixture of Teflon® 30 and H$_2$O (1:4 volume ratio) to form a slurry. The slurry was coated onto a 1 cm$^2$ gold foil substrate. The coating was dried at 100° C. and then fired at 300° C. for 1 hour. A gold wire was attached to the gold foil substrate to make an electrode which was tested as an oxygen reduction cathode in 2N H$_2$SO$_4$ electrolyte (saturated with oxygen and then with nitrogen) at 23° C. The oxygen reduction characteristics are shown in FIG. 10.

The electrode was also measured as an anode for oxygen evolution. The following electrochemical data for oxygen evolution currents were measured:

| Electrolyte | Temp. | Current (@ 1.6 V/H.E.) |
|---|---|---|
| 2N H$_2$SO$_4$ | 23 | 0.3 mA |
| 2N H$_2$SO$_4$ | 78 | 2.5 mA |

EXAMPLE 7

Measurements on similarly-prepared electrodes of Pt$_3$MgO$_6$ (as in Example 4) and Pt$_3$CuO$_6$ (as in Example 6) were also made in other electrolytes, namely, 85% H$_3$PO$_4$ at 185° C. and 5N KOH at 23° C. For Pt$_3$MgO$_6$ and Pt$_3$CuO$_6$ electrodes in 85% H$_3$PO$_4$ at 185° C. the current densities for oxygen reduction at 0.8 V/H.E. were 10 mA/cm$^2$ and 8 mA/cm$^2$, respectively. In 5N KOH the oxygen reduction current density was 0.1 mA/cm$^2$ at about 0.05 V/H.E. for both Pt$_3$MgO$_6$ and Pt$_3$CuO$_6$ electrodes.

We claim:

1. Electrochemical cell comprising an electrolyte and two electrodes, one of which is an oxygen electrode containing an electrocatalyst material which is a platinum-metal oxide of orthorhombic crystal structure and having the prototype formula Pt$_3$MO$_6$ wherein M is Mn, Fe, Co, Ni, Zn, Mg, Ca, Cu, Cd or Hg.

2. Fuel cell comprising the electrochemical cell of claim 1 wherein an acid electrolyte is used.

3. Fuel cell of claim 2 wherein the electrolyte is an H$_3$PO$_4$ aqueous solution.

4. Fuel cell of claim 2 wherein the electrolyte is an H$_2$SO$_4$ aqueous solution.

5. Fuel cell comprising the electrochemical cell of claim 1 wherein an alkaline electrolyte is used.

6. Fuel cell of claim 5 wherein the electrolyte is a KOH aqueous solution.

7. Caustic-chlorine producing cell comprising the electrochemical cell of claim 1.

8. Air-metal battery comprising the electrochemical cell of claim 1.

9. Electrolyzer comprising the electrochemical cell of claim 1.

10. Metal electrowinning device comprising the electrochemical cell of claim 1.

11. The fuel cell of claim 2 in which the electrocatalyst is Pt$_x$Mn$_y$O$_6$ wherein x is about 2.2 to about 3.2, y is about 1.0 to about 1.4, and x+y is about 3.2 to about 4.3.

12. The fuel cell of claim 2 in which the electrocatalyst is Pt$_x$Fe$_y$O$_6$ wherein x is about 2.2 to about 3.2, y is about 1.0 to about 1.4, L and x+y is about 3.2 to about 4.3.

13. The fuel cell of claim 2 in which the electrocatalyst is Pt$_x$Co$_y$O$_6$ wherein x is about 2.2 to about 3.2, y is about 1.0 to about 1.4, and x+y is about 3.2 to about 4.3.

14. The fuel cell of claim 2 in which the electrocatalyst is Pt$_x$Ni$_y$O$_6$ wherein x is about 2.2 to about 3.2, y is about 1.0 to about 1.4, and x+y is about 3.2 to about 4.3.

15. The fuel cell of claim 2 in which the electrocatalyst is Pt$_x$Zn$_y$O$_6$ whereinx is about 2.2 to about 3.2, y is about 1.0 to about 1.4, and x+y is about 3.2 to about 4.3.

16. The fuel cell of claim 2 in which the electrocatalyst is Pt$_x$Mg$_y$O$_6$ wherein x is about 2.2 to about 3.2, y is about 1.0 to about 1.4, and x+y is about 3.2 to about 4.3.

17. The fuel cell of claim 2 in which the electrocatalyst is Pt$_3$CaO$_6$.

18. The fuel cell of claim 2 in which the electrocatalyst is Pt$_3$CuO$_6$.

19. The fuel cell of claim 2 in which the electrocatalyst is Pt$_3$CdO$_6$.

20. The fuel cell of claim 2 in which the electrocatalyst is Pt$_3$HgO$_6$.

* * * * *

UNITED STATES PATENT OFFICE
CERTIFICATE OF CORRECTION

PATENT NO. : 4,264,685
DATED : April 28, 1981
INVENTOR(S) : Peter F. Carcia, Robert Day Shannon and Dimitri N. Staikos It is certified that error appears in the above—identified patent and that said Letters Patent are hereby corrected as shown below:

Column 8, line 47, After "1.4," and before "and", delete the L.

Signed and Sealed this

Twenty-seventh Day of October 1981

[SEAL]

Attest:

Attesting Officer

GERALD J. MOSSINGHOFF

Commissioner of Patents and Trademarks